Sept. 19, 1944.   C. H. HARRIS   2,358,327
EXPOSURE COUNTER
Filed Oct. 3, 1941
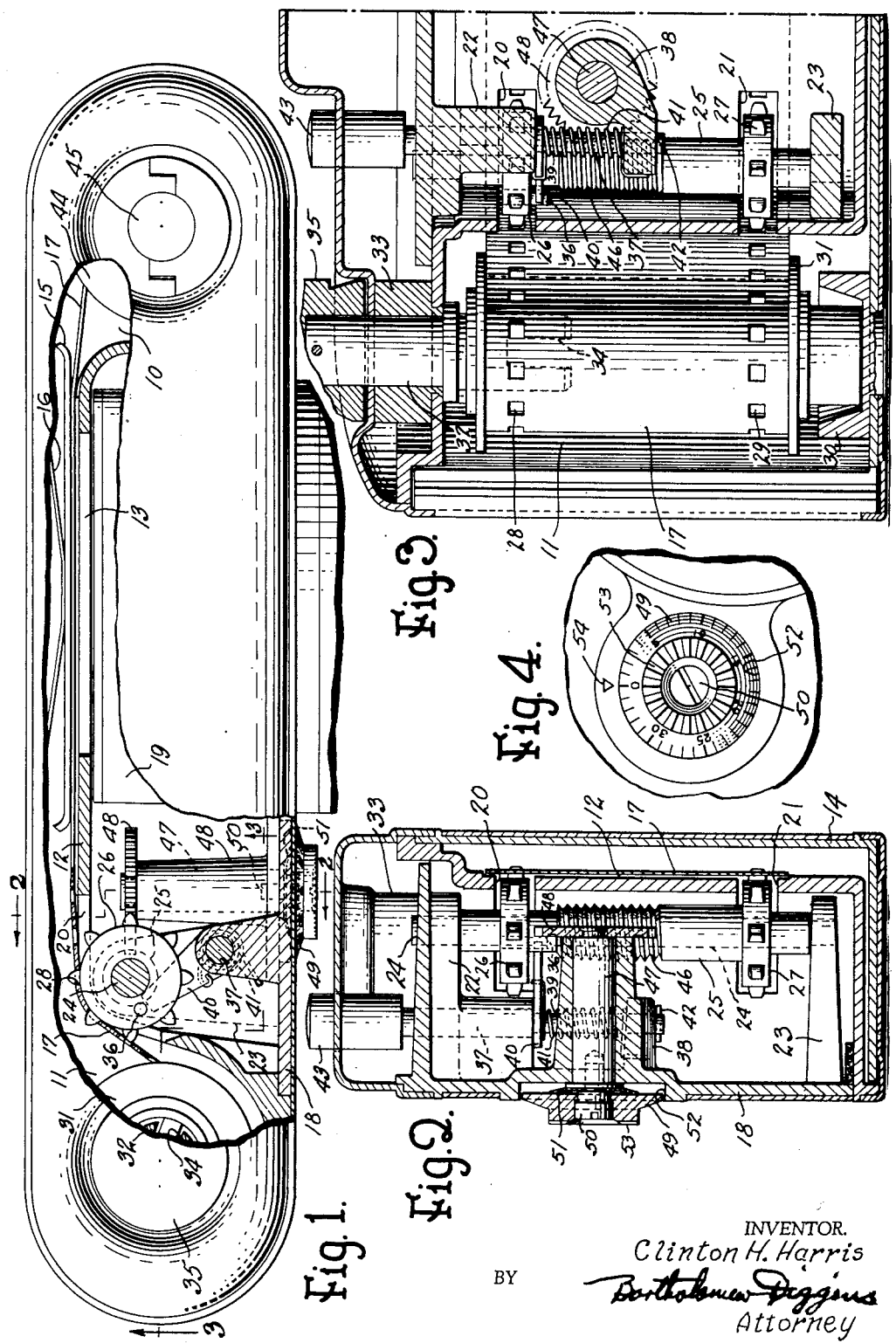
INVENTOR.
Clinton H. Harris
BY
Bartholomew Diggins
Attorney Patented Sept. 19, 1944

2,358,327

UNITED STATES PATENT OFFICE 2,358,327

EXPOSURE COUNTER

Clinton H. Harris, Ann Arbor, Mich., assignor to Argus, Incorporated, a corporation of Michigan Application October 3, 1941, Serial No. 413,514

3 Claims. (Cl. 95—31)

The present invention relates to photographic cameras, and more particularly to exposure counting mechanisms for perforated roll film cameras. One of the objects of the present invention is to provide a simple and efficient mechanism for indicating the number of exposures in a perforated roll film camera. Another object is to provide a camera in which the film is releasably stopped when a fresh exposure area has been moved into position. A further object is to provide a rugged self-contained mechanism for measuring and counting the exposures in a roll film camera. These and other objects and advantages reside in certain novel features of construction, arrangement and combination of parts, as will hereinafter be more fully set forth and pointed out in the appended claims.

In the drawing:

Figure 1 is a top plan view of a camera embodying my invention with parts broken away to show internal structure.

Figure 2 is a section taken on line 2—2 of Figure 1.

Figure 3 is a section taken on line 3—3 of Figure 1.

Figure 4 is a fragmentary front elevation of the counter dial.

In the drawing I have illustrated my invention as applied to a specific camera, but it is to be understood that it is applicable to a wide variety of cameras. The details of construction of the camera illustrated form no part of the present invention but are described and claimed in my co-pending application, Serial No. 413,518 filed concurrently herewith, and entitled "Photographic camera."

The camera illustrated consists of a body portion having a supply roll cavity 10 and a take-up roll cavity 11. A film track 12 extends between the cavities 10 and 11 and has the usual exposure aperture 13. The camera cover 14 which is releasably attached to the body portion carries a pressure plate 15 which is pressed forward by a spring 16 to hold a film 17 flat at the exposure aperture 13. The camera body has a cavity which is closed by a front wall 18. The usual focusing objective mount indicated at 19 may be carried by this front wall 18.

The film track 12 is provided with two slots 20 and 21 adjacent the takeup cavity 11. Two horizontal supports 22 and 23 project inwardly from the front plate 18 toward the film track 12. A vertical shaft 24 is fixed in these supports adjacent the slots 20 and 21. The sleeve 25 rotatably mounted on the shaft 24 has two sprocket wheels 26 and 27 rigidly fixed thereto. These sprocket wheels are spaced apart a distance equal to the distance between the slots 20 and 21 and project through the slots 20 and 21 into the path of the film 17.

The present counter mechanism is illustrated in connection with the perforated 35 mm. film and the sprockets 26 and 27 engage in the perforations 28 and 29 of the film.

At the bottom of the takeup cavity 11, there is a seat 30 for receiving the lower end of the usual film reel or spool 31. This seat is carried by the removable cover 14. A spindle 32 is rotatably journalled in a bearing 33 carried by the camera body and projects downwardly into the cavity 11 directly above the seat 30. The end of this spindle is bifurcated as indicated at 34 to engage the usual winding balance of the reel 31. A knob 35 outside of the camera may be manually rotated to wind the film 17 on the reel 31. In moving to this takeup reel 31, the sprocket holes 28 of the film 17 positively engage the sprockets 26 and 27 and rotate the sleeve 25. In order to stop the film when a fresh exposure area has been moved into alignment with the exposure aperture 13, a stud 36 is rigidly fixed in the sprocket 26.

A shaft 37 is vertically slidable in supports 22 and 38. The end of this shaft 37 below the support 22 is reduced in diameter as indicated at 39. A flat detent 40 is rotatably mounted on this reduced portion 39 of the shaft 37 and projects toward the shaft 24 into the path of the stud 36. A coil spring 41 encircles the reduced portion 39 of the shaft 37, one end of this spring 41 engaging the support 38 and the other end engaging the detent 40. This spring 41 thus serves both to urge the detent 40 and shaft 37 upward toward the support 22 and to press the outer end of the detent 40 against the sleeve 25. A pin 42 extends transversely through the bottom of the shaft 37 beneath the support 38, and prevents withdrawal of the shaft 37. A button 43 is formed on the upper end of the shaft 37 and projects above the top of the camera. When this button is depressed, the detent 40 is moved downward parallel to the shafts 37 and 24 out of the path of the stud 36. The sprockets 26 and 27 are then free to rotate, and the film may be wound on the takeup roll 31. As soon as this winding movement is started, the button 42 should be released so that the detent 40 again moves upward into the path of the stud 36 so that the sprockets 26 and 27 have stopped after one complete revolution.

The sprockets 26 and 27 are made of such size that their circumference is slightly greater than the length of the exposure aperture 13. When the entire roll of film has been exposed, the film 17 is rewound on the supply roll 44 by a winding mechanism indicated at 45. When the film is moved in this direction, the stud 36 engages the side of the detent 40 and moves the detent out of the way against the tension of the spring 41. Thus, the entire roll of film can be rewound on to the supply spool 44 without actuating the release button 43.

In order to indicate the movement of exposures which have been made, the sleeve 25 has a threaded portion 46 between the sprockets 26 and 27. A spindle 47 is rotatably journalled in the support 38. This spindle extends inwardly from the front wall 18 of the camera perpendicular to the spindle 24. A worm wheel 48 is fixed on the rear end of the spindle 47 and engages the threaded portion 46 of the sleeve 25. An indicating dial 49 is attached to the spindle 47 by a shoulder screw 50, and a spring washer 51 between the dial 49 and spindle 47 frictionally holds the dial 49 in set position on the shaft 47.

The front wall 18 of the camera is preferably recessed as indicated at 52, and the dial 49 is located within this recess. Thus, the dial is protected from accidental displacement. Immediately surrounding the shoulder screw 50, the dial 49 has a raised knurled portion 53 by which the dial may be adjusted relative to the spindle 47. An index 54 on the front wall of the camera cooperates with the markings on the dial to indicate the number of exposures which have been made.

The number of teeth on the threaded portion 46 and the worm wheel 48 are such that one complete revolution of the sprockets 26 and 27 turn the dial through only a single division. In operation, the camera is loaded by threading the film over the guide 12 and sprockets 26 and 27 on to the takeup roll 31. The camera is then closed and the dial 49 rotated relative to the shaft 47 until the zero mark on the dial is opposite the index 54 on the camera body. Each exposure thereafter will then move the dial through one division so that the number of exposures will be accurately indicated.

From the foregoing, it will be apparent that I am able to attain the objects of my invention and provide a simple, efficient and compact exposure counting mechanism for cameras. While I have shown my invention as applied to a particular type of camera, it will be readily apparent that this construction can be used in cameras of many types.

I claim:

1. In a camera having takeup and supply spool chambers, a sprocket adapted to be engaged and rotated by film passing between the spools, said sprocket comprising a rotatable shaft and a toothed wheel rigid with said shaft, a lateral projection on said wheel, a slidable control plunger parallel to said shaft, a detent bar rotatably carried by said plunger and axially shiftable therealong in one direction, a combined compression and torsion spring surrounding said plunger and connected to said detent bar, said spring axially urging said plunger and detent bar in the direction of said toothed wheel, and said spring angularly urging said detent bar toward said sprocket until the side of said detent bar bears against said shaft, with the free end of said detent bar in the path of rotation of said projection, said projection being operable to rock said detent bar about the axis of said plunger against the torsional action of said spring and permit said shaft to rotate in one direction and a manual control knob on said plunger outside the camera wall, said plunger being connected to displace said detent bar axially away from said toothed wheel to clear said projection when said knob is depressed and permit rotation of said shaft in the opposite direction.

2. In a camera, a body having a front wall and a top wall, a pair of vertically spaced supports projecting inwardly from said front wall, a vertical sprocket shaft journalled in said supports, a pair of sprockets rigidly carried by said shaft and adapted to engage the perforations of a strip of film, a third support carried by said front wall interiorly of said camera, an exposure counter shaft journalled in said supports substantially at right angles to said sprocket shaft, a counter dial mounted on said exposure counter shaft exteriorly of said front wall; a worm gear on said last-mentioned shaft meshing with a worm provided on said sprocket shaft intermediate said sprockets; a fourth support projecting downwardly from said top wall, a plunger mounted for vertical reciprocation in said fourth support and an extension provided on said third support, a pawl freely pivoted on said plunger, a combined torsion and compression spring mounted on said plunger and urging said pawl axially toward one of said supports and angularly into engagement with said sprocket shaft, said pawl having a free end disposed in the path of rotation of an abutment carried by said sprocket shaft and adapted to lock the latter against rotation in one direction and permit free rotation in the opposite direction, means on said plunger exteriorly of said top wall for shifting it endwise, and means for causing said plunger to shift said pawl axially out of the path of said abutment when said plunger is shifted, to permit rotation of said sprocket in said one direction.

3. In a camera having a body providing a front wall and an objective lens assembly on said front wall, a shaft journalled normal to and projecting through said front wall, an exposure counter dial carried by said shaft exteriorly of said wall, and cooperating with indicia means on the latter to indicate the number of exposures, a sprocket shaft mounted for rotation at right angles to said indicator shaft carrying a pair of spaced sprockets adapted to coact with a strip of film, a worm on said sprocket shaft intermediate said sprockets meshing with a worm gear on said indicator shaft, a pair of spaced supports on said front wall, a plunger mounted for axial sliding movement in said supports, and having an operating portion disposed outside the camera body, a pawl freely pivoted on said plunger and axially movable therealong in one direction and terminating in a locking face disposed in the path of an abutment carried by one of said sprockets when said pawl is engaged with said sprocket shaft, said plunger being so located as to dispose said pawl substantially tangentially to the path of rotation of said abutment, so as to positively lock said sprocket against rotation in film winding direction, a coil spring surrounding said plunger and urging said pawl toward one of said supports and reacting against the other support, means for anchoring said spring to the latter support under sufficient torsional stress to resiliently maintain said pawl in engagement with said sprocket shaft and being yieldable to permit said abutment to pivot said pawl out of the way when said sprocket shaft is rotated in film re-winding direction, and a shoulder on said plunger operable to engage one side of said pawl and move it axially against the expansive action of said spring into a position out of the path of rotation of said abutment, when said plunger is shifted endwise, to permit rotation of said sprocket shaft in film winding direction, the torsional force of said spring maintaining said pawl in engagement with said shaft while said pawl is being shifted axially.

CLINTON H. HARRIS.